United States Patent [19]

Roche et al.

[11] 3,926,073
[45] Dec. 16, 1975

[54] AUTOMATIC TRANSMISSIONS WITH PLANETARY GEARS HAVING A BRAKING MECHANISM CAPABLE OF BEING PRE-ASSEMBLED

[75] Inventors: Jean Claude Roche, Rueil-Malmaison; Martial Lavarec, Paris; Jean Maurice, St. Germain de la Grange, all of France

[73] Assignees: Regie Nationale des Usines Renault; Societe dite: Automobiles Peugeot, both of Paris, France

[22] Filed: Jan. 31, 1974

[21] Appl. No.: 438,402

[52] U.S. Cl. ................... 74/753; 74/762; 74/763
[51] Int. Cl.² .................. F16H 57/10; F16H 03/44
[58] Field of Search ............ 74/753, 762, 763, 789, 74/790

[56] References Cited
UNITED STATES PATENTS

| | | | |
|---|---|---|---|
| 2,518,824 | 8/1950 | Simpson | 74/763 |
| 2,930,258 | 3/1960 | Flinn | 74/763 |
| 3,602,055 | 8/1971 | Hause | 74/763 X |
| 3,656,372 | 4/1972 | Chana | 74/753 X |
| 3,780,601 | 12/1973 | Dach et al. | 74/762 |
| 3,803,948 | 4/1974 | Clauss, Jr. et al. | 74/763 |

*Primary Examiner*—Samuel Scott
*Assistant Examiner*—P. S. Lall
*Attorney, Agent, or Firm*—Oblon, Fisher, Spivak, McClelland & Maier

[57] ABSTRACT

An automatic transmission having a planetary gear train includes a housing with coaxially disposed brake mechanisms controlled by spring-biased hydraulic pistons for actuating the braking means associated with the elements of the planetary gear train. A portion of the brake casing projects radially inwardly towards the longitudinal axis of the casing so as to form a supporting surface for the brake friction discs, the periphery of the casing also being provided with means for securing the same to the transmission housing as well as to a bulkhead for supporting the braking devices. The inner walls of the casing also provide seats for the piston return springs which are interposed between the projecting portion of the casing and radially extending portions of the pistons.

4 Claims, 7 Drawing Figures

AUTOMATIC TRANSMISSIONS WITH PLANETARY GEARS HAVING A BRAKING MECHANISM CAPABLE OF BEING PRE-ASSEMBLED

BACKGROUND OF THE INVENTION

1. Field of the Invention

The present invention relates generally to automatic transmissions with planetary gear trains in which a bulkhead supports the hydraulic control cylinders for the locking or braking devices associated with the elements of the gear train, and more particularly to a simplified structural assembly of the cylinders and locking devices which may be secured to the bulkhead with a fewer number of bolts and which is readily adaptable to receive preassembled locking devices.

2. Description of the Prior Art

It is well known that the bulkhead of a transmission supports the planetary gear cage and transmits pressurized fluid to one or two rotating disc brakes. The bulkhead also serves to counter the torque transmitted by means of the free wheel and sometimes serves to lubricate various component parts of the mechanism. These bulkheads often take up a large amount of axial space with respect to the maximum allowable torque, such being the result of the arrangement of the supply and distribution passages for the pressurized oil.

To diminish the radial congestion and the weight of the bulkhead and consequently that of the transmission mechanism, one conventional transmission utilizes radially disposed supply passages for the pressurized fluid. It is seen however that this approach has an unfavorable influence upon the location of the hydraulic control actuators of the braking mechanisms. With the aim of separating the lubricating system from the pressurized fluid supply passages to the brake control cylinders, it is common to fix these cylinders to the walls of the bulkhead. Thus, the known realizations of hydraulically controlled planetary gear trains have their hydraulic actuator cylinders fixed exteriorly of the bulkhead.

In order to decrease the number of parts within the brake mechanisms, bulkheads have been utilized which have cylinders within which move pistons having radial extensions against which the piston return springs are seated. These brakes however cannot be assembled prior to installation within the transmission due to the fact that their pressure plates must be fixed to the housing with the guiding supports for the brake friction discs interposed between the radial extensions of the piston.

Although the need for preassembled brakes is substantial, their use has not become widespread due to the large number of parts necessary for mounting them.

SUMMARY OF THE INVENTION

Accordingly, it is the primary object of the present invention to remedy the aforenoted difficulties.

The foregoing and other objectives are achieved according to this invention through the provision of a preassembled brake of the type containing a casing, a piston movable axially within the casing, a cylinder for housing the piston, non-rotatable, axially movable friction discs within the casing, and piston return springs for releasing the brake. A portion of the casing projects radially inwardly towards the casing axis and forms one support surface for the friction discs, and the periphery of the casing includes means for fastening the casing to the housing and the bulkhead, the internal walls of the casing, and radial extensions of the pistons, providing seats for the return springs.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
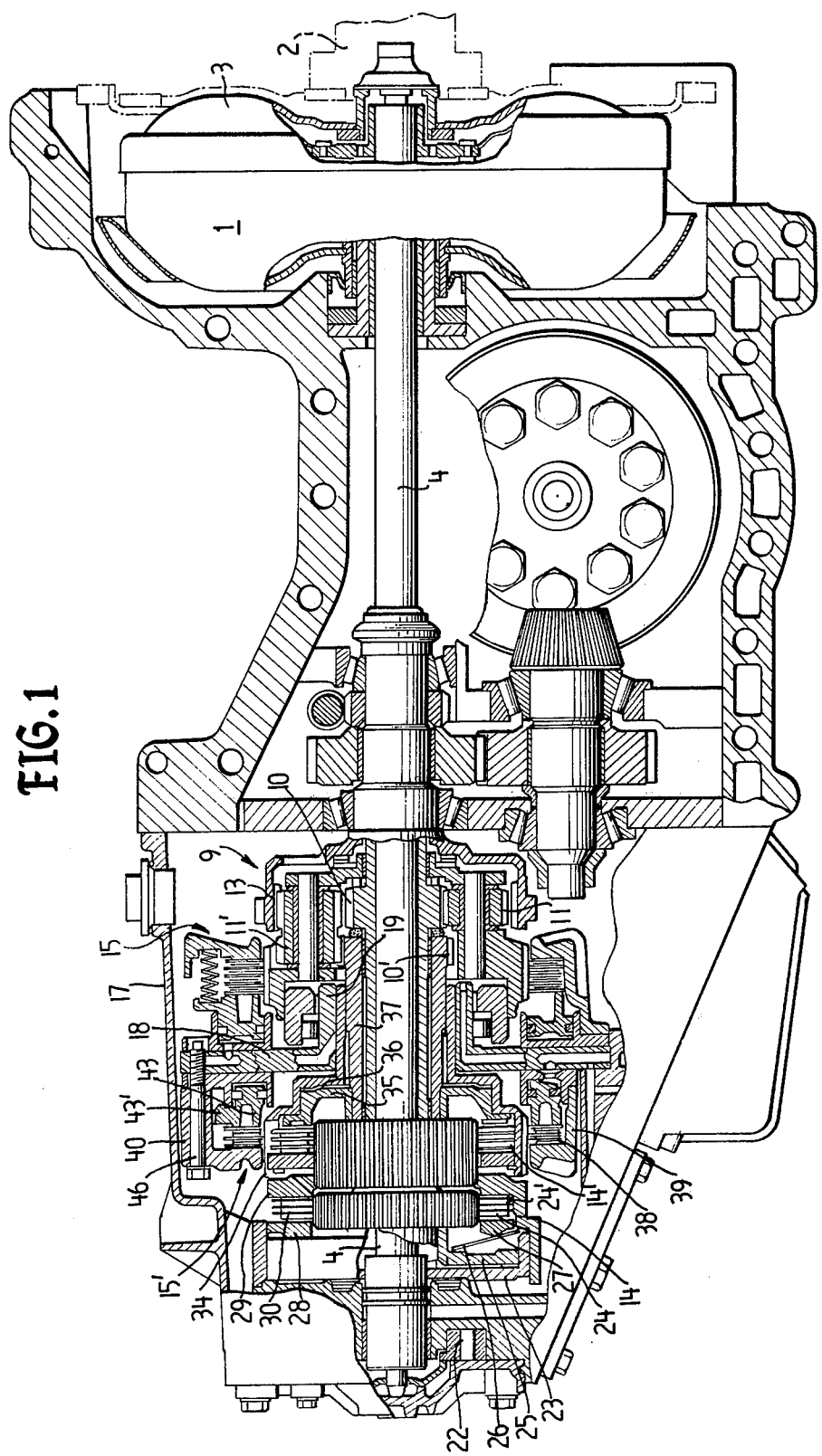
FIG. 1 is a view, partly in section, of the transmission utilizing the brake constructed according to the present invention and showing its cooperative parts.

Referring now to the drawings and more particulary to FIG. 1 thereof, a hydrodynamic torque convertor generally indicated by the reference character 1, is mounted upon the end portion of the engine crankshaft 2 and an output device or turbine 3 of the torque convertor is connected to an input shaft 4. A planetary gear train, generally indicated by the reference character 9 includes a plurality of elements among which are present two sun gears 10 and 10' coaxially disposed upon shaft 4 and two planetary gears 11 and 11', having different lengths, respectively engaged with gears 10 and 10' and supported upon cage 12, the planetary train further including an annular member 13 which meshes with the planetary gears 11'.

Clutch mechanisms 14 and 14' as well as brake mechanisms, generally indicated by the reference characters 15 and 15' are coaxially and serially disposed about shaft 4, while a free wheel 20 facilitates three forward speeds and one reverse speed to be obtained from the output shaft 16 of the transmission. A bulkhead 18 secured to the housing 17 forms a bearing 19 for the free wheel 20 and is provided with channels 21 and 21' for the distribution of fluid fed thereto by means of an oil pump 22.

The clutch 14, secured to shaft 4 by means of its drum 30 and its cylinder 23, carries a set of faced discs 24 and a set of smooth discs 24', and the clamping together or pressurization of these discs is accomplished through means of a piston 25 suitably actuated by means of fluid pressure. An annular elastic diaphragm 26 serves to retract the piston 25 and a fulcrum 27, provided upon an annular pressure plate 28 serves to increase the pressurization effect of the piston 25. Another pressure plate 29 is integrally formed upon the rear portion of drum 30, and the discs 24 and 24' are respectively fixed within a rotational mode with respect to the drum 30 and with a hub 31 of the clutch mechanism by means of splines.

The drum 30 is similarly connected to the sun gear 10 of the planetary gear train by means of hub 31 and a hollow shaft 32, upon which sun gear 10 is integrally formed, by means of splines, the clutch 14 thereby providing a coupling between the input shaft 4 and the sun gear 10. The clutch 14' likewise couples the input shaft 4 with the sun gear 10', clutch 14' also being composed of two sets of faced and smooth discs, a drum 34, and a piston 35 adapted to be actuated by means of a hydraulic cylinder 36. The drum 34 is connected to the sun gear 10' by means of a hollow shaft 37 while the drum 30 is connected to the input shaft 4, the coupling between the drums 30 and 34 being effected by means of the discs associated with clutch 14 as described hereinabove.

Figure 2:
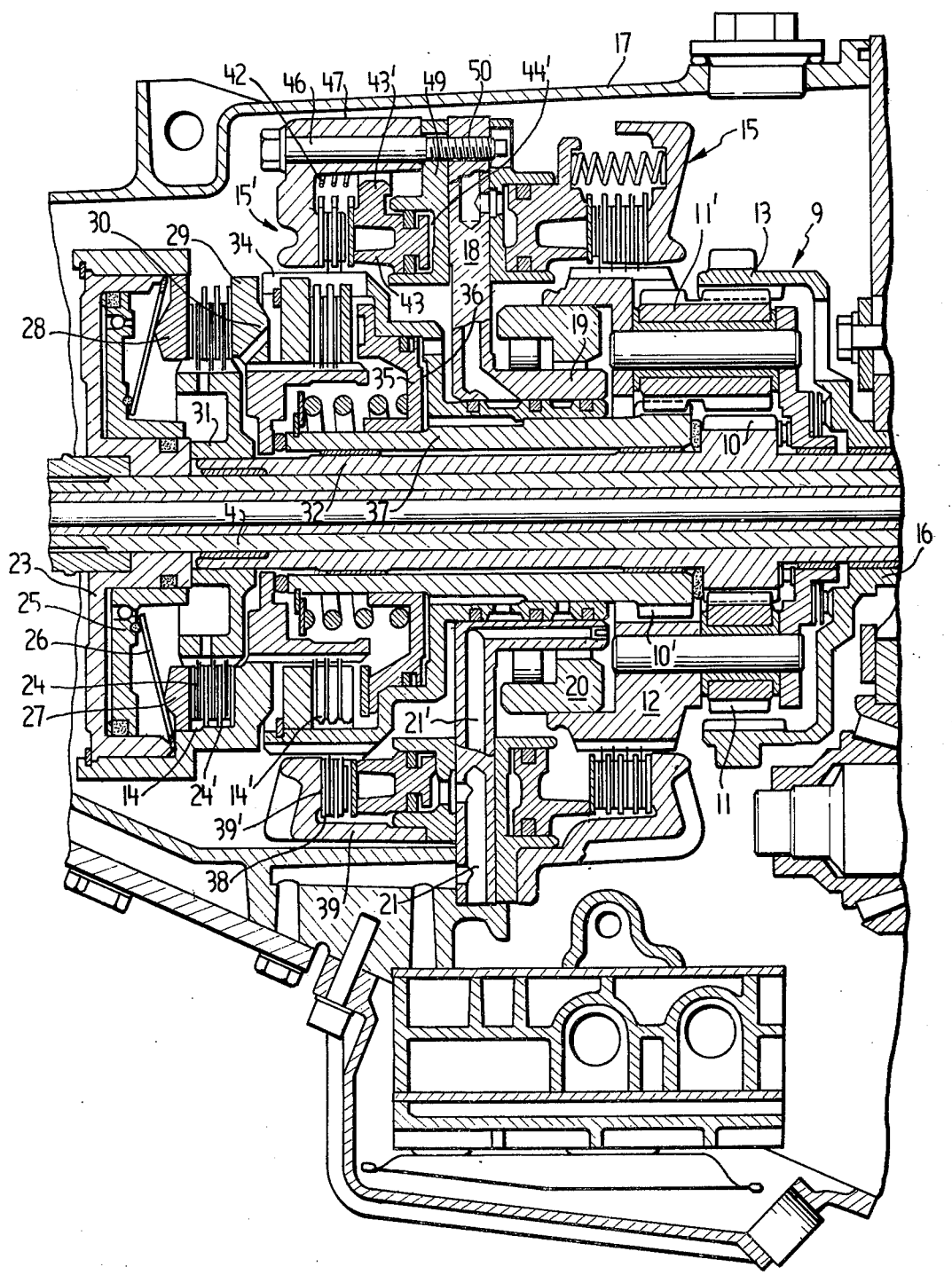
FIG. 2 is a partial view of FIG. 1, shown however upon an enlarged scale.
Figure 3:
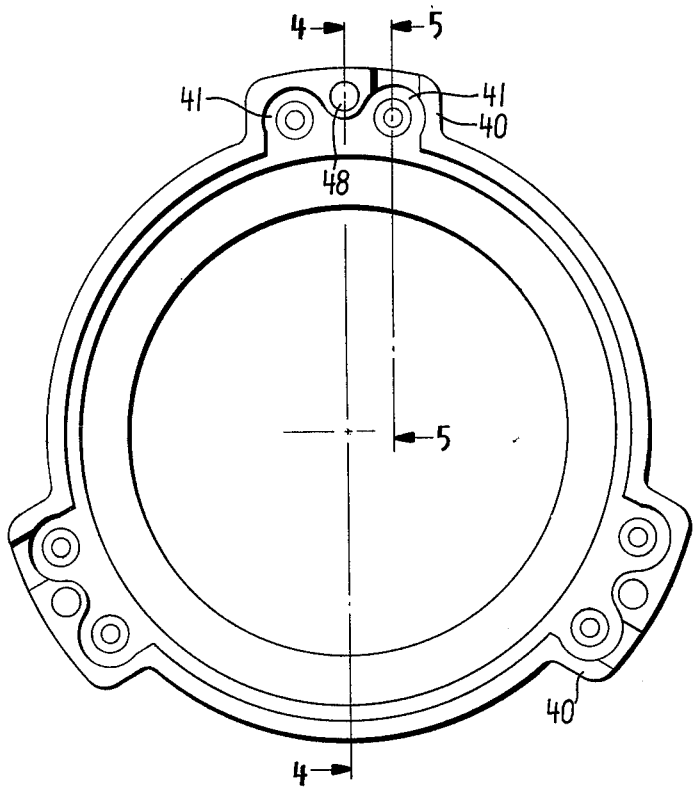
FIG. 3 is a front view of the brake casing.
Figure 5:
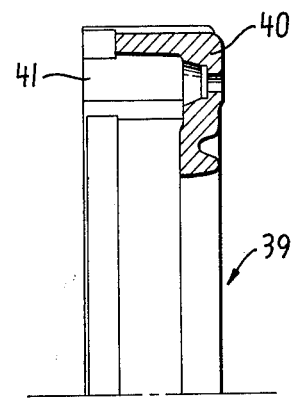
FIG. 5 is a cross-section of the casing of FIG. 3 taken along the line V—V of FIG. 3.
Figure 4:
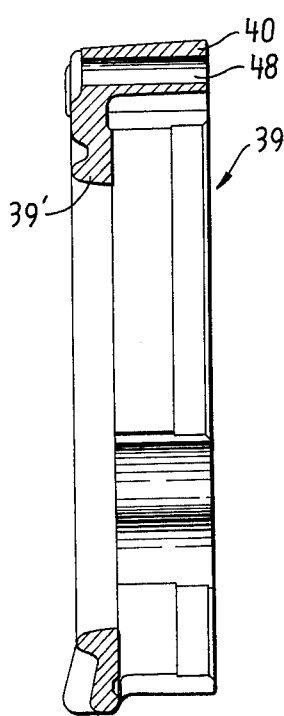
FIG. 4 is a cross-section of the casing of FIG. 3 taken along the line IV—IV of FIG. 3.
Figure 6:
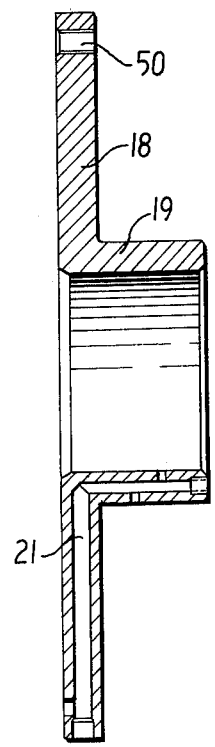
FIG. 6 is a cross-sectional view of the transmission bulkhead.

The brake 15', which provides the rotational coupling between the sun gear 10' and the housing 17, is composed of a set of discs 38 interposed between a piston 43 and a lip portion 39' of a casing 39 which is secured to the bulkhead 18, as best seen in FIGS. 2 and 6. The lip portion 39' of the casing 39 is directed radially inwardly towards the longitudinal axis of the casing and the transmission, and the means of securing the casing 39 to the housing 17 can be accomplished by any one of several means, such as for example, screws, splines or lugs 40, as may be seen in FIGS. 3, 4 and 5, equidistantly spaced about the periphery of casing 39 and adapted to be fitted within notches 47 provided within housing 17.

The lugs 40 each have a bore 48 through which a bolt 46 may be inserted so as to threadedly engage a tapped hole 50 provided within bulkhead 18 as may be seen in FIGS. 2 and 6. The lugs extend axially along the casing 39 so as to form seats 41 for return springs 42 associated with piston 43, springs 42 being arrayed in pairs within seats 41 and mounted in a compressed state between the lip portion 39' of the casing 39 and a radially extended portion 43' of the piston 43. As seen in FIGS. 1 and 2, the piston 43 can move within a cylinder 44' which is formed within an annular member 49 which is clamped between the casing 39 and the bulkhead 18, the cylinder 44' being fed by means of the fluid passageway 21.

The above description of the brake 15' applies equally well to brake 15 as is seen from FIG. 2, but it is obvious that one of the casings of the brake assemblies can be integrally formed as a portion of the housing, and it should also be appreciated that the brake 15', or the combined system including both mechanisms 15 and 15' can be assembled prior to installation within the housing 17. In assembling such mechanisms, the discs 38 and springs 42 would be initially mounted within casing 39 after which such members would be retained therein by means of the piston 43 being placed within the cylinder 44'. The unit thus formed may then be secured to the bulkhead 18 by such means as bolts 46, prior to installation within housing 17.

Figure 7:
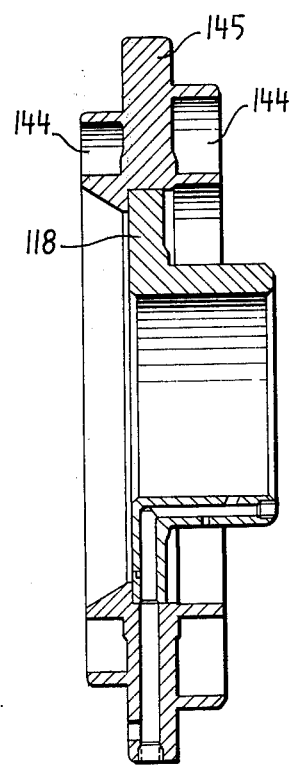
FIG. 7 is a cross-section of another embodiment of the transmission bulkhead in conjunction with the brake cylinders.

Referring now to FIG. 7, another embodiment of the brake assemblies is disclosed wherein the cylinders 144 are disposed in contiguous relationship for housing the piston 43 of the brakes 15 and 15' and are formed within an annulus 145 which is secured upon the bulkhead 118, the diameter of which is reduced in relation to that of bulkhead 18, by means of a press fitting operation, splining, or the like, such that the cylinders extend upon opposite sides of the bulkhead. The assembly is accomplished in a manner similar to that described above with respect to casing 39, the brakes 15 and 15' constituting in this case, along with the bulkhead 118, a preassembled unit.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. An automatic transmission having a planetary gear train and braking and clutching mechanisms associated with the elements of the planetary gear train comprising:

a housing;

coaxially disposed means provided within said housing, hydraulically controlled by means of spring biased pistons, for actuating said braking and clutching mechanisms for said elements of said planetary gear train;

a bulkhead forming the bearing for a free wheel and connected to said housing;

channel means for the distribution of hydraulic fluid to said braking mechanisms;

a brake casing fixed to said bulkhead; and friction discs disposed within said casing, said casing including a single portion projecting radially inwardly towards the longitudinal axis thereof so as to form a supporting surface for said friction discs, and wherein the periphery of said casing includes first means for securing said casing to said housing and second means for securing said casing to said bulkhead, internal wall portions of said casing forming seat means for said piston springs which are secured between said single radially inward portion of said casing and radially extending portion of said pistons.

2. The automatic transmission as set forth in claim 1, wherein said first securing means of said casing comprises:

lugs which are adapted to fit within corresponding recesses provided within said housing;

said lugs extending axially along said casing so as to define said seat means for said piston springs; and wherein said lugs have at least one bore for receiving said second securing means.

3. The automatic transmission as set forth in claim 1, wherein the cylinders associated with said pistons are formed within an annular member secured to said bulkhead.

4. The automatic transmission as set forth in claim 3 wherein said annular member is provided with cylinder means such that said cylinders extend from opposite sides of said bulkhead whereby said brakes constitute, along with said annular member, a pre-assembled unit.

* * * * *